Feb. 24, 1925.
K. ARNSTEIN
HOLLOW BAR IN TWO PIECES
Filed June 28, 1920
1,527,728
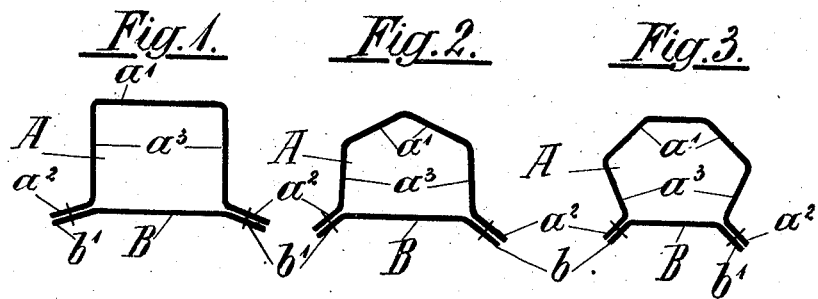
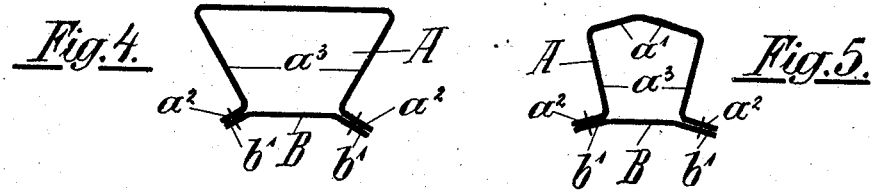
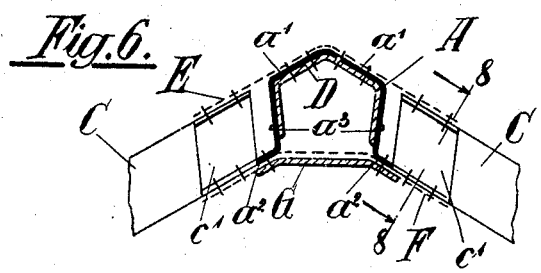
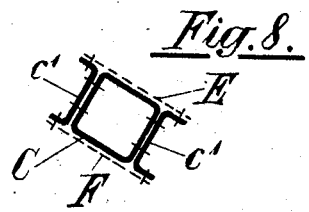
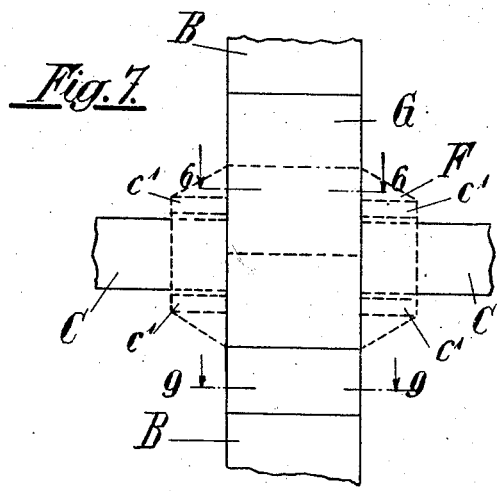
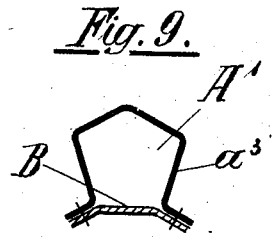
INVENTOR:
Dr Karl Arnstein Patented Feb. 24, 1925.

1,527,728

UNITED STATES PATENT OFFICE.

KARL ARNSTEIN, OF FRIEDRICHSHAFEN, GERMANY, ASSIGNOR TO THE FIRM LUFT-SCHIFFBAU ZEPPELIN GESELLSCHAFT MIT BESCHRANKTER HAFTUNG, OF FRIEDRICHSHAFEN, GERMANY.

HOLLOW BAR IN TWO PIECES.

Application filed June 28, 1920. Serial No. 392,484.

(GRANTED UNDER THE PROVISIONS OF THE ACT OF MARCH 3, 1921, 41 STAT. L., 1313.)

*To all whom it may concern:*

Be it known that I, KARL ARNSTEIN, a citizen of the Czechoslovakian Republic, residing at Friedrichshafen, Germany, have invented certain new and useful Improvements in Hollow Bars in Two Pieces (for which I have filed application in Germany Nov. 5th, 1917), of which the following is a specification.

My invention refers to hollow bars such as used in light structures, e. g. in the construction of a r craft, which for this reason must combine a minimum weight with a maximum resistance to buckling and bending. My invention concerns especially a hollow bar made in two pieces of such design that it can easily be connected with other bars and chiefly comes into consideration for the booms of light girders. It is especially suitable for compound joints and system points of light girders, e. g. of frames for airships of the rigid type.

The new hollow bar made in two pieces consists of a hollow part having a section with three or more faces and connection flanges pointing in the direction of the adjoining frame-work members and a U-shaped cover strip with obtuse-angled flanges of the same inclination. Preferably the faces of the hollow part of the section opposite the cover strip are arranged fairly in parallel to the flanges intended to connect it with the cover str p. On account of the particular shape of the section lateral bars can be easily joined and the joint is permanently easily accessible for work to be done, so that it can be reinforced without any trouble, no matter whether one or several lateral bare are to be joined or not. The joint is reinforced according to the invention by covering the hollow part of the section by an inner butt and an outer connecting plate after the cover strip has been cut out to match. Upon the missing stretch a connection plate is riveted, which, like the connection plate already mounted, is fitted on both sides with overlapping ends for the adjoining of the lattice work bars. The hollow part of the section can possess three, four or five faces, so that the finished section has four, five or six sides. A hollow bar of pentagonal section has proved especially advantageous as having a great resistance to shocks and because a connection plate with one bend only can be used for the connection with lateral bars. With four- and six-sided sections such a connection plate has two bends. On the other hand w th the four-sided section, especially if its adjoining faces are made perpendicular to one another, the inner butt serving to cover the joint has the simplest section. The six-sided section again offers the advantage that adjoining bars of the same height of section have the smallest height. If the sides next to the adjo ning bars are arranged approximately perpendicular upon the sides next to the top of the section, the lattice work bars can be cut off at right angles to their longitudinal axis, whereby the connection is made simpler and the connection plates are enlarged.

In the drawings affixed to this specification and forming part thereof several mod - fications of bars according to my invention are illustrated.

In the drawings—

Figs. 1–5 are sections of different hollow bars coming under the invention,

Fig. 6 an assembled joint of a frame in section along line 6—6 in F g. 7,

F g. 7 a view of the said joint as seen from underneath,

Fig. 8 a section of a lateral bar along line 8—8 in Fig. 6 and

Fig. 9 a section along line 9—9 in Fig. 7.

In the examples shown in Figs. 1–5 the primary shape of the polygonal section A is either a quadrangle or a pentagon or a hexagon. The comparatively wide cover strip B has flanges $b^1$ which are bent more or less outwards. In Fig. 1 the outer wall $a^1$ stands upright upon the side walls $a^3$ between them and the connection flanges $a^2$. In Fig. 2 each flange $b^1$ is bent sideways, in Figs. 3, 5, 6 and 9 each flange is parallel to side $a'$ of the hollow part A of the section adjacent to the flanged side $a^3$. In Figs. 1 and 2 the connection flanges $a^2$ are arranged obliquely on the adjacent sides $a^3$. In Fig. 3 the angle of inclination between the flanges $a^2$ and sides $a^3$ is approximately and in Figs. 4 and 5 exactly 90°.

In the assembled joint according to Figs.

6-9 two main booms A, A¹ meet in one centre with two lateral bars C arranged perpendicularly upon them. In the jointed ends of the main booms A, A¹ both cover strips B are cut away far enough to be able to insert an inner butt D into the open pentagonal section A thus obtained and to fasten it by rivets on the faces $a^1$ together with the outer connection plate E. To secure the joint quite safely the inner butt D according to Fig. 6 is preferably made wide enough as to be riveted on to the faces $a^3$ of the pentagonal section as well. On the flanges $a^2$ of this section another outer connection plate F is fastened by rivets. A somewhat longer cover strip G finally ensures a further reinforcement and a special joint cover of the cover strip section B, but is not indispensable. The lateral bars C, which may be of any section, are joined on individually according to their shape. In the example the section is supposed to be a closed hollow square. In this case a connection without cutting into the bars is very easily made by riveting two U-bars $c^1$ on to the ends of the bars and connecting their flanges with the plates E and F. In a similar way any other open or closed section may used, as the plates E and F are easily accessible from all sides.

By varying the angle at the apex of the pentagon one may obtain as well assembling points for a three or four-edged pyramidal mast as a fifteen- or twenty-sided prismatic airship frame, since the sides adjoining the apex ensure a good direct connection of lateral bars. However if the angles and the proportions of the surfaces are well chosen, four- and six-sided sections are just as suitable for these purposes. I wish it to be understood that I do not desire to be limited to the exact details of construction shown and described, for obvious modifications will occur to a person skilled in the art.

I claim:

1. A structural sheet metal member comprising in combination, a flanged polygonal channel member and a flat plate or strip applied against and fixed to the flanges of said member so as to cover the channel, said flanges and the parts of said plate or strip contacting therewith extending at an obtuse angle to said plate or strip.

2. A structural sheet metal member comprising in combination, a flanged pentagonal channel member and a flat plate or strip applied against and fixed to the flanges of said member so as to cover the channel, said flanges and the parts of said plate or strip contacting therewith extending at an obtuse angle to said plate or strip, and in parallel with the bottom portion of said channel disposed on the same side.

In testimony whereof I affix my signature.

KARL ARNSTEIN.